United States Patent
Karve

(10) Patent No.: US 12,293,137 B2
(45) Date of Patent: May 6, 2025

(54) PROCESSOR CORE SIMULATOR INCLUDING TRACE-BASED COHERENT CACHE DRIVEN MEMORY TRAFFIC GENERATOR

(71) Applicant: International Business Machines Corporation, Armonk, NY (US)

(72) Inventor: Mohit Karve, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 932 days.

(21) Appl. No.: 17/405,420

(22) Filed: Aug. 18, 2021

(65) Prior Publication Data

US 2023/0056423 A1  Feb. 23, 2023

(51) Int. Cl.
G06F 30/20 (2020.01)
G06F 12/0811 (2016.01)
G06F 12/0862 (2016.01)
G06F 115/10 (2020.01)

(52) U.S. Cl.
CPC .......... G06F 30/20 (2020.01); G06F 12/0811 (2013.01); G06F 12/0862 (2013.01);
(Continued)

(58) Field of Classification Search
CPC .. G06F 30/20; G06F 12/0811; G06F 12/0862; G06F 2115/10; G06F 2212/1021;
(Continued)

(56) References Cited

U.S. PATENT DOCUMENTS 9,274,960 B2  3/2016  Kaxiras et al.
9,846,627 B2  12/2017  Solihin et al.
(Continued)

FOREIGN PATENT DOCUMENTS

CN  104660585 B  3/2018
WO  2006090328 A2  8/2006

OTHER PUBLICATIONS

Elrabaa ME, Hroub A, Mudawar MF, Al-Aghbari A, Al-Asli M, Khayyat A. A very fast trace-driven simulation platform for chip-multiprocessors architectural explorations. IEEE Transactions on Parallel and Distributed Systems. Jun. 8, 2017;28(11):3033-45. (Year: 2017).*

Jagtap, Radhika, Stephan Diestelhorst, Andreas Hansson, and Matthias Jung. "Exploring system performance using elastic traces: Fast, accurate and portable." In 2016 International Conference on Embedded Computer Systems: Architectures, Modeling and Simulation (SAMOS), pp. 96-105. IEEE, 2016. (Year: 2016).*

(Continued)

*Primary Examiner* — Eunhee Kim
(74) *Attorney, Agent, or Firm* — Cantor Colburn LLP; Nicholas Welling

(57) ABSTRACT

A core simulator includes one or more simulated processors, a trace-based traffic generator, and a simulated memory subsystem. Each simulated processor includes a core element and at least one lower-level cache excluded from the core element. The trace-based traffic generator includes a plurality of modeled caches that model the at least lower-level cache without modeling the core element. The trace-based traffic generator is configured to receive at least one workload trace and based on the workload trace simulate actual memory traffic to be processed by the simulated memory subsystem. The simulated memory subsystem is shared between the at least one simulated processor and the trace-based traffic generator. The trace-based traffic generator performs a data exchange with the memory subsystem based on the at least one workload trace. The data exchange impacts a measured performance of the at least one simulated processor.

20 Claims, 4 Drawing Sheets

(52) U.S. Cl.
CPC .. *G06F 2115/10* (2020.01); *G06F 2212/1021* (2013.01); *G06F 2212/602* (2013.01)

(58) Field of Classification Search
CPC ....... G06F 2212/602; G06F 2212/1016; G06F 30/3308; G06F 12/0895; G06F 2212/1008
See application file for complete search history.

(56) References Cited

U.S. PATENT DOCUMENTS

| | | |
|---|---|---|
| 10,261,915 B2 | 4/2019 | John et al. |
| 10,902,547 B2 | 1/2021 | Surti et al. |
| 2011/0295587 A1* | 12/2011 | Eeckhout ............ G06F 11/3457 703/21 |
| 2017/0220719 A1* | 8/2017 | Elrabaa .................. G06F 30/33 |

OTHER PUBLICATIONS

Lowe-Power J, Ahmad AM, Akram A, Alian M, Amslinger R, Andreozzi M, Armejach A, Asmussen N, Beckmann B, Bharadwaj S, Black G. The gem5 simulator: Version 20.0+. arXiv preprint arXiv:2007.03152. Jul. 7, 2020. (Year: 2020).*

Butko et al., "A trace-driven approach for fast and accurate simulation of manycore architectures." The 20th Asia and South Pacific Design Automation Conference. IEEE, Jan. 2015 (7 pages).

Trotter et al., "Cache simulation for irregular memory traffic on multi-core CPUs: Case study on performance models for sparse matrix-vector multiplication." Journal of Parallel and Distributed Computing 144 (Oct. 2020): pp. 189-205.

* cited by examiner

PROCESSOR CORE SIMULATOR INCLUDING TRACE-BASED COHERENT CACHE DRIVEN MEMORY TRAFFIC GENERATOR

BACKGROUND

The present invention generally relates to processor design, and more specifically, to processor core performance simulators.

Modern processors typically integrate multiple cores to run multiple processes at the same time, thereby increasing CPU performance during high bandwidth utilization scenarios, e.g., when multitasking or operating under increased traffic demands. During the processor design phase, multi-core performance processor simulators are utilized to perform performance testing and traffic modeling prior to finalizing the processor design for fabrication. Most cycle accurate core performance simulators model a small number of cores and the corresponding caches (e.g., the L1, L2, and L3 caches). Due to the complexity of modeling real or actual memory traffic, most processor simulators use a "traffic generator" that generates synthetic memory access patterns. These synthetic memory access patterns provide an indication of a measured processor performance in a high bandwidth utilization scenario.

SUMMARY

According to a non-limiting embodiment, a computer implemented method comprises simulating at least one processor including a core element and at least one lower-level cache excluded from the core element; and simulating a trace-based traffic generator that includes a plurality of modeled caches that model the at least one lower-level cache without modeling the core element. The simulated trace-based traffic generator is configured to receive at least one workload trace and based on the workload trace simulate actual memory traffic. The method further comprises simulating a memory subsystem that is shared between the at least one simulated processor and the simulated trace-based traffic generator. The simulated trace-based traffic generator performs a data exchange with the simulated memory subsystem based on the at least one workload trace, the data exchange impacting a measured performance of the at least one simulated processor.

According to another non-limiting embodiment, a computer system comprises a core simulator. The core simulator includes one or more simulated processors, a trace-based traffic generator, and a memory subsystem. Each simulated processor includes a core element and at least one lower-level cache excluded from the core element. The trace-based traffic generator includes a plurality of modeled caches that model the at least lower-level cache without modeling the core element. The trace-based traffic generator is configured to receive at least one workload trace and based on the workload trace simulate actual memory traffic to be processed by the simulated memory subsystem. The memory subsystem is shared between the at least one simulated processor and the trace-based traffic generator. The trace-based traffic generator performs a data exchange with the memory subsystem based on the at least one workload trace. The data exchange impacts a measured performance of the at least one simulated processor.

According to yet another non-limiting embodiment, a computer program product comprising a computer readable storage medium having program instructions embodied therewith, the program instructions executable by one or more processors to cause the one or more processors to perform operations comprising simulating at least one processor including a core element and at least one lower-level cache excluded from the core element; and simulating a trace-based traffic generator that includes a plurality of modeled caches that model the at least one lower-level cache without modeling the core element. The simulated trace-based traffic generator is configured to receive at least one workload trace and based on the workload trace simulate actual memory traffic to be processed by the simulated memory subsystem. The method further comprises simulating a memory subsystem that is shared between the at least one simulated processor and the simulated trace-based traffic generator. The simulated trace-based traffic generator performs a data exchange with the simulated memory subsystem based on the at least one workload trace, the data exchange impacting a measured performance of the at least one simulated processor.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
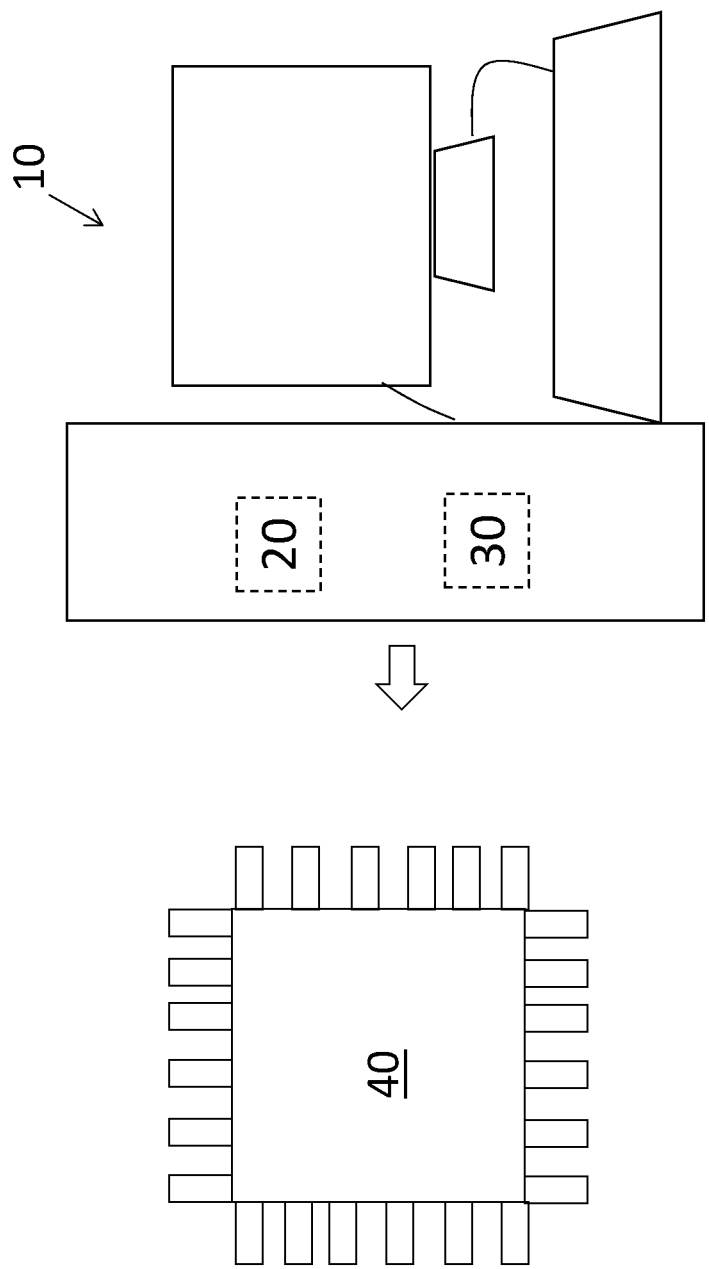
FIG. 1 depicts a block diagram of an example system capable of executing a trace-based coherent cache driven memory traffic generator for a core simulator utilized in integrated circuit design.

The three broad families of traffic generators are echo traffic generators (sometimes referred to as "echo traffic buffers"), synthetic traffic generators (sometimes referred to as "synthetic core models), and full traffic generators (sometimes referred to as "full core models"). Echo traffic generators are the simplest of the generators described above. Echo traffic generators assume that all of the cores included in a simulated processor are running a similar workload, but are offset in terms of the memory they access and/or the time when the memory is accessed. Memory traffic output from a simulated core is modified as needed and sent to a buffer (e.g., one buffer per core). At some time later, these access requests are "replayed" from the buffer and sent to memory. Echo traffic generators are limited in that they require using the same workload trace. Consequently, echo traffic generators are incapable of modeling heterogeneous processor performance.

Synthetic core models employ one traffic generator per core included in a simulated processor. The simulated processor is configured with a rate of loads and stores, along with an assumed rate of cache misses in the last level cache of a simulated core. Although the access patterns can be customized, all aspects of the pattern must be defined by a user (e.g., a testing engineer) and it may not be practical to define an access pattern that represents a real or actual workload that will be experienced by the core.

The full core modeling approach fully models all cores in a simulated processor. Accordingly, a full core generator provides actual access patterns for each core included in the simulated processor. However, full core generators are known to have run times that can reach orders of magnitudes longer than echo traffic generators or synthetic traffic generators.

One or more embodiments of the present disclosure provide a trace-based coherent cache driven memory traffic generator for a core simulator. The trace-based coherent cache driven memory traffic generator (referred to going forward as a trace-based traffic generator) provides a model that interfaces with the core simulator via a memory bus to send requests, and is capable of modeling one cache per simulated core. Accordingly, the runtime computation intensity of the trace-based traffic generator is significantly reduced compared to full traffic generators.

The trace-based model also consumes real workload traces at a specified rate and is able to dynamically adjust the performance of the workload trace based on observed bandwidth consumption. Because the trace-based model is driven by real workload traces rather than synthesized workload traces, the trace-based model is significantly more representative of actual memory traffic compared to a synthesized model approach.

In addition, the trace-based traffic generator described herein allows for inputting different workload traces unlike a single core generator that is limited to inputting the same workload trace. For example, the trace-based traffic generator can drive any core included in the simulated processor using similar traces, dissimilar traces, or a combination thereof. Therefore, the trace-based traffic generator described herein can model heterogeneous processor performance.

With reference now to FIG. 1, a block diagram of a system 10 to execute a trace-based traffic generator for a core simulator utilized in integrated circuit (IC) design is illustrated according to one or more embodiments of the invention. The system 10 includes processing circuitry 20 and memory 30 storing one or more software programs and code (collectively referred to as software). The software can include, but is not limited to, computer readable program instructions for carrying out operations of the present invention, assembler instructions, instruction-set-architecture (ISA) instructions, traffic generator and simulator programs, workload traces, cache layout information, instruction and data addresses, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

The processing circuitry 20 and software stored in the memory 30 can be used to simulate and measure the performance (e.g., a system-level performance) of a processor design including one or more cores of an IC design. For example, the processor circuitry 20 and software 30 can operate together to execute a core simulator that uses a trace-based traffic generator. The trace-based traffic generator includes a plurality of modeled caches that model the effective cache size of a simulated processor (e.g., the designed processor to be tested) and are configured to receive a workload trace. Based on the workload trace, the trace-based traffic generator simulates actual memory traffic that would be realized by full processor cores.

Based on the workload trace, the trace-based traffic generator also simulates data exchanges between a simulated memory subsystem and the modeled caches which impact or affect the measured performance of the simulated processor. For example, the simulated data exchanges can impact the measured performance of the simulated processor by causing delays to the simulated processor's memory requests. These delays may be a result of queueing behind the requests that are provided by one or more of the trace-based traffic generators. The delays may also be the result of bandwidth consumption caused by these generated requests. The simulated data exchanges may also cause a secondary impact to the measured performance of the simulated core. For example, the data prefetcher in the simulated core will react to the available bandwidth in the memory subsystem and accordingly prefetch more or less aggressively. Changes to the prefetch activity will result in changes in the observed memory latencies for some requests from the simulated core. Accordingly, the simulated data exchanges described herein can impact the measured performance of the simulated processor. In this manner, performance of a processor design can be tested, measured, and analyzed such that design modifications can be performed before fabrication, if necessary.

Once the design is finalized, it is ultimately fabricated into an integrated circuit 40. The steps involved in the fabrication of the integrated circuit 40 are well-known and only briefly described herein. The physical layout is then finalized and is provided to a foundry. Masks are generated for each layer of the integrated circuit 40 based on the finalized physical layout. Then, the wafer is processed in the sequence of the mask order. The processing includes photolithography and etch.

Figure 2:
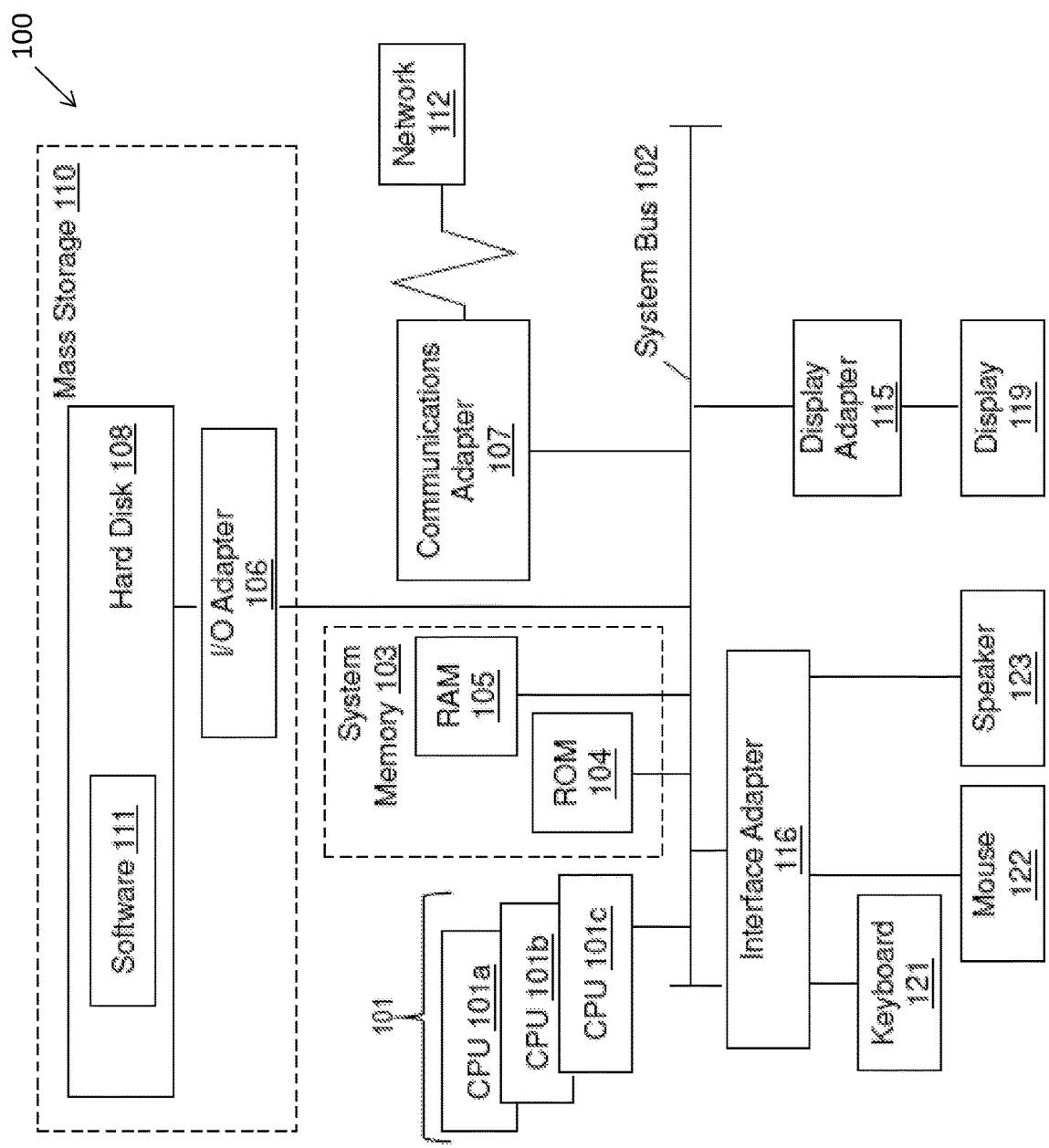
FIG. 2 depicts a block diagram of an example computer system for use in conjunction with one or more embodiments of the present disclosure.

Turning now to FIG. 2, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 2.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 2, the computer system 100 includes processing capability in the form of the processors 101, and storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 2 is not intended to indicate that the computer system 100 is to include all of the components shown in FIG. 2. Rather, the computer system 100 can include any appropriate fewer or additional components not illustrated in FIG. 2 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
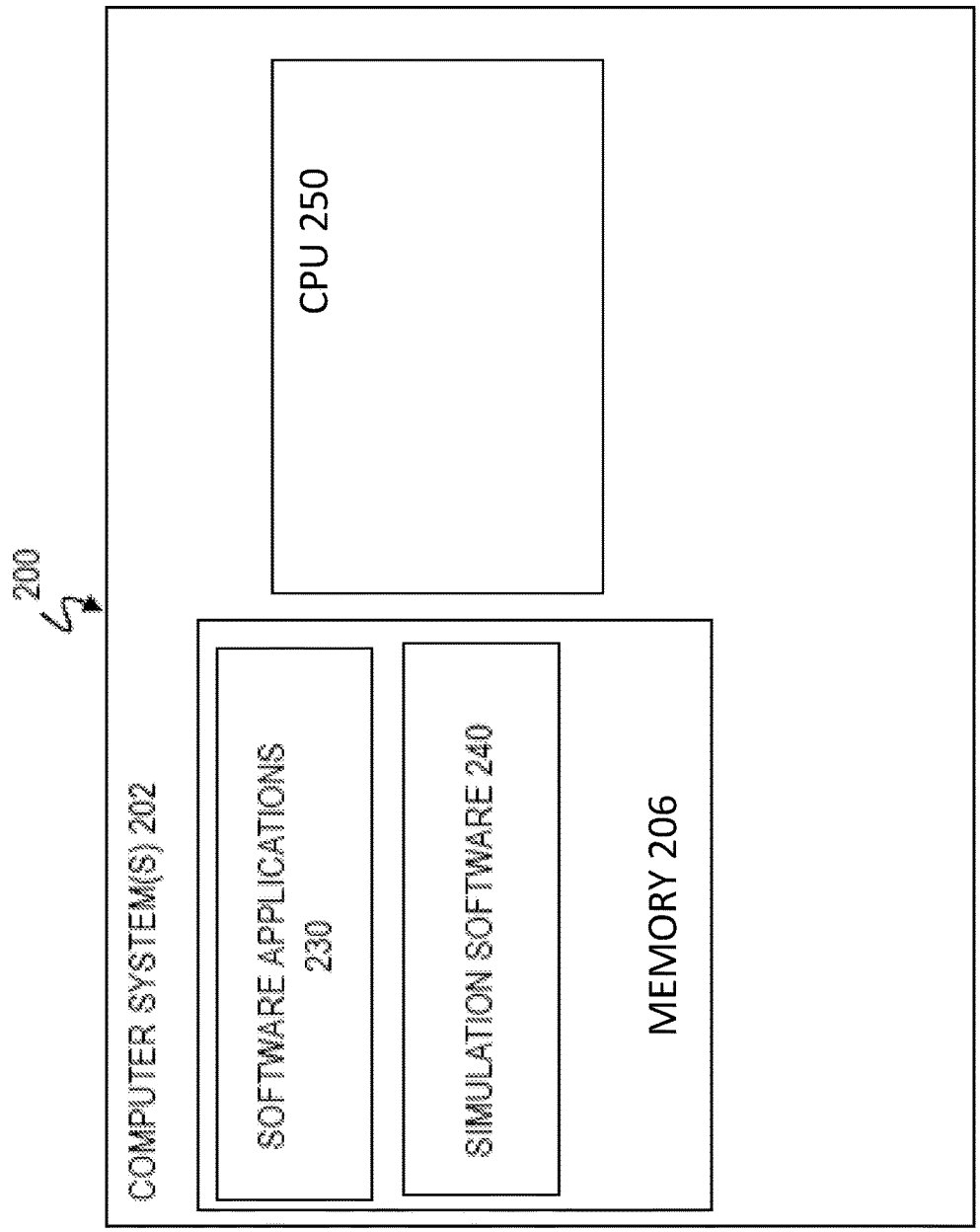
FIG. 3 is a block diagram of a system employing a core simulator that utilizes a trace-based coherent cache driven memory traffic generator according to a non-limiting embodiment of the present disclosure.

Referring to FIG. 3 a block diagram of a system 200 employing a core simulator that utilizes a trace-based traffic generator according to a non-limiting embodiment. The system 200 includes one or more computer systems 202. One or more elements of the system 100 illustrated in FIG. 2 may be used in and/or integrated into computer system 202. One or more software applications 230 and simulation software applications 240 stored in memory 206 can utilize and/or be implemented as software 111 executed by a CPU 250. Software applications 230 may include, be integrated with, and/or employ various types of software including but not limited to hardware description languages (HDLs) like SystemVerilog and VHDL to create high-level representations of a circuit, from which lower-level representations and ultimately actual wiring can be derived. HDL is a specialized computer language used to describe the structure and behavior of electronic circuits, and most commonly, digital logic circuits. A hardware description language enables a precise, formal description of an electronic circuit that allows for the automated analysis and simulation of an electronic circuit.

Figure 4:
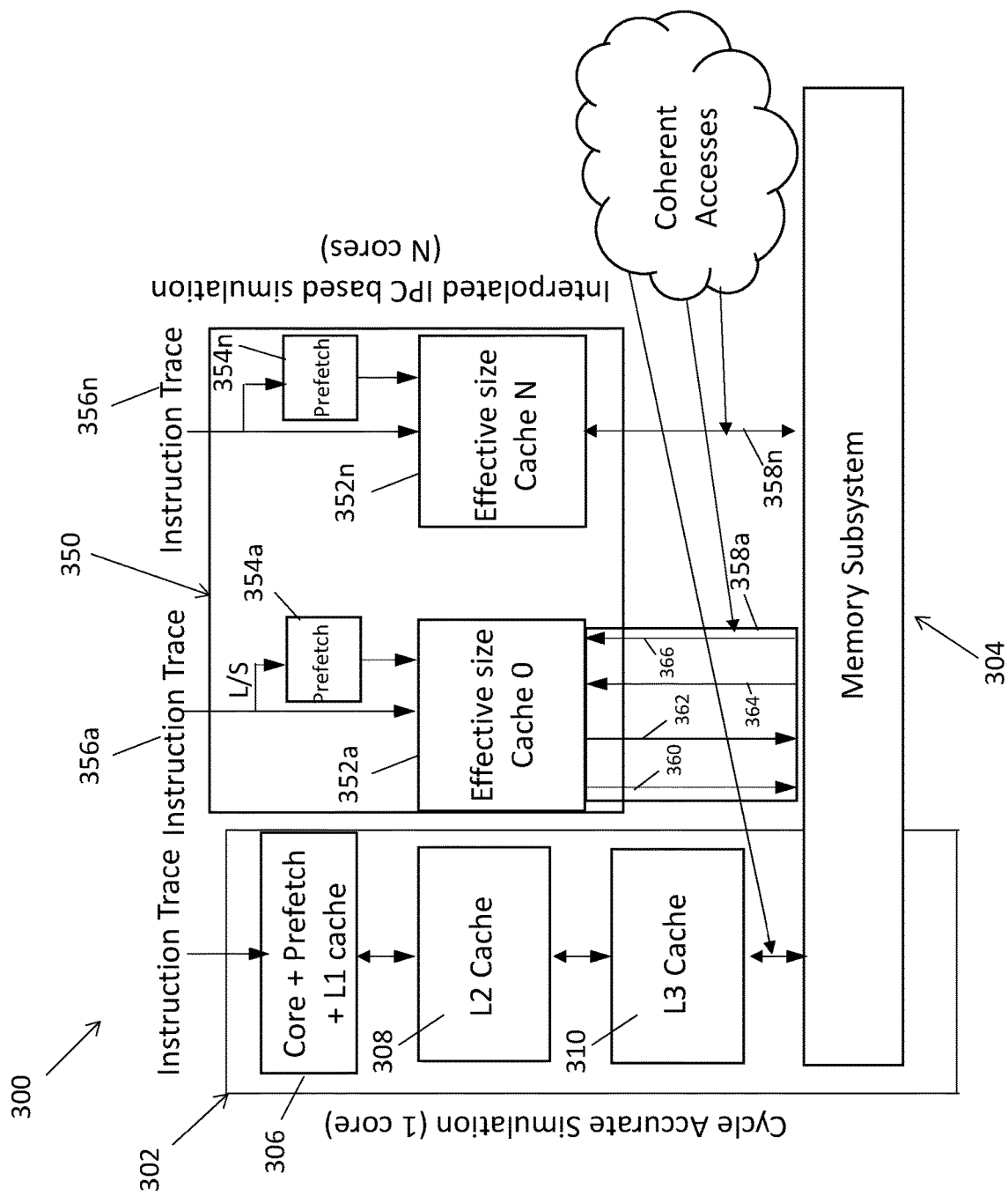
FIG. 4 is a block diagram illustrating a core simulator including a trace-based coherent cache driven memory traffic generator according to a non-limiting embodiment of the present disclosure.

Turning now to FIG. 4, a core simulator 300 is illustrated according to a non-limiting embodiment. The core simulator 300 includes a simulated processor 302, a memory subsystem 304, and a trace-based traffic generator 350. The simulated processor 302 includes a simulated core element 306, a first lower-level cache 308 (e.g., an L2 cache 308), and a second lower-level cache 310 (e.g., an L3 cache 310) having a lower hierarchy than the first lower-level cache 308.

The simulated core element 306 includes a core prefetcher and a core-level cache (e.g., an L1 cache). The sub-elements (e.g., the core-level cache (L1) and the core prefetcher) of the core element 306 effectively define a simulated core 306. The simulated core element 306 is configured to perform operations such as arithmetic operations (add operations, subtraction operations, division operations, multiplication operations, etc.) that are not relevant in terms of modeling system-level performance. According to a non-limiting embodiment, the lower-level caches 308 and 310 (e.g., the L2 and L3 caches) are excluded from the simulated core element 306. Although two lower-level caches 308 and 310 are shown, it should be appreciated that a greater number of lower-level caches can be employed without departing from the scope of the present disclosure.

The simulated processor 302 illustrated in FIG. 4 is shown to have exclusive lower-level caches (e.g., an L2 cache that is exclusive from the L3 cache). Accordingly, the L1 and L2 caches are inclusive with respect to the data stored in the L1 cache (included in the core element 306) is guaranteed to be stored in the L2 cache. However, data stored in the L2 cache 308 is guaranteed to not be stored in the L3 cache 310, and vice versa. It should be appreciated, however, that the simulated processor 302 is not limited to employing an exclusive cache design. In other examples, the simulated processor 302 can implement an inclusive cache (e.g., an inclusive L2/L3 cache). In an inclusive cache design, data stored in the L2 cache is guaranteed to also be stored in the L3 cache.

The trace-based traffic generator 350 includes one or more modeled caches 352a-352n and a prefetcher 354a-354n associated with a respective modeled cache 352a-352n. The trace-based traffic generator 350 differs from the full simulated processor 302 in that it excludes the core elements that are irrelevant to system-level performance. For example, the trace-based traffic generator 350 strips away or excludes elements or models of arithmetic operations performed by the core element 306 (e.g., add operations, subtract operations, divide operations etc.) Instead, the trace-based traffic generator 350 models the system-level performance such as, for example, the rate of memory accesses associated with the modeled caches 352a-352n and how the memory accesses of a given modeled cache 352a-352n affects its respective prefetcher 354a-354n.

Each modeled cache 352a-352n has an effective size that is the same size (e.g., matches) as an effective cache size of the core element 306. For example, when the simulated processor 302 implements exclusive L2 and L3 caches as shown in FIG. 4, the modeled caches 352a-352n have an effective size that is the sum of the L2 cache size and the L3 cache size. According to another example, when the simulated processor 302 implements an inclusive L2/L3 cache, the modeled caches 352a-352n have the same size as the L3 cache.

The trace-based traffic generator 350 itself is driven by one or more workload traces 356a-356n (also referred to as "instruction traces", or simply "traces"). A user specifies a range of instructions per cycle (IPCs) or a "target IPC" for a given workload trace 356a-356n. The high end IPC will be the IPC of the workload trace 356a-356n when not constrained by memory, while the low end IPC is the performance when bandwidth consumption is at a maximum rate. Based on a current bandwidth in the system, a given workload trace 356a-356n will be consumed at an interpolated IPC between the maximum rate and the minimum rate.

For each workload trace 356a-356n consumed, a corresponding instruction address is checked against a given modeled cache 352a-352n. In addition, if the instruction is a load instruction or store instruction, a corresponding data address is also checked against a given modeled cache 352a-352n. If either the instruction address or the data address misses the given modeled cache 352a-352n, then consumption of the corresponding workload trace 356a-356n is stopped for the current cycle (i.e., the IPC in which the miss occurred) and a memory access request is generated for accessing the memory subsystem 304 to obtain the address associated with the cache miss.

The data exchange 358a-358n between a given modeled cache 352a-352n and the memory subsystem 304 provides various information indicative of the modeled caches' 352a-352n influence on system-level performance. A given data exchange 358a-358n includes a request signal for a cache line read 360, a returned cache line signal 362 written back to the memory subsystem 304 following writing to a modeled cache 352a-352n, a data reload signal 364 from the memory subsystem 304 to a modeled cache 352a-352n (e.g., a reload of the cache line), and a memory bandwidth utilization signal 366 indicating the memory subsystem's 304 current memory usage. Based on the data exchanges 358a-358n, the trace-based traffic generator 350 can model a system-level performance of the simulated processor 302. The modeled system-level performance can include, for example, an impact that a workload trace would have on the performance simulated processor 302. The modeled system-level performance can also include, for example, determining whether a given workload trace 356a-356n is capable of being processed by the modeled caches 352a-352n and prefetchers 354a-354n within a minimum latency target value. Accordingly, the trace-based traffic generator 350 can simulate real or actual memory traffic that would be realized by full processor cores which allows for projecting processor core performance (e.g., system-level performance) at a fraction of the computation intensity of full-core models.

The prefetcher 354a-354n associated with a given modeled cache 352a-352n is configured to determine patterns in the load and store (L/S) instructions included in a given workload trace 356a-356n. Based on a determined pattern, the prefetcher 354a-354n attempts to prefetch expected data to be read into its respective modeled cache 352a-352n (commonly referred to as "prefetch speculation"). According to a non-limiting embodiment, a given prefetcher 354a-354n can analyze the patterns along with the available bandwidth indicated by the memory bandwidth utilization signal 366 and dynamically determine the amount of data to prefetch.

In a cycle when all instruction and data addresses from a given trace are found in the modeled cache 352a-352n (e.g., "hit" the modeled cache 352a-352n) and the target IPC is met, a buffered prefetch can be sent. If this buffered prefetch misses the modeled cache 352a-352n, the buffered prefetch is sent to the memory subsystem 304 where it produces an interference with the simulated processor 302. Accordingly, this interference can be analyzed to determine its overall effect (e.g., miss penalty or latency effect) on the simulated processor performance.

In one or more embodiments, the shared memory subsystem 304 can model cache coherence between the simulated processor 302 and the trace-based traffic generator 350. That is, the core simulator 300 can utilize the trace-based traffic generator 350 while still ensuring the simulated processor 302 and all the modeled caches 352a-352n are processing the correct data (e.g., non-stale data). For example, coherence requests can be sent to the modeled caches 352a-352n. A hit in a given modeled cache 352a-352n will reduce latency for a request from the simulated core element 306. Similarly, a write request to a given modeled cache 352a-352n can potentially invalidate lines in the simulated core element 306 and cause reduced performance.

Various embodiments of the present disclosure are described with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer system comprising a core simulator, the core simulator comprising:
   at least one simulated processor including a core element and at least one lower-level cache excluded from the core element;
   a trace-based traffic generator that includes a plurality of modeled caches that model the at least one lower-level cache without modeling the core element, the trace-based traffic generator configured to receive at least one workload trace and based on the workload trace to simulate actual memory traffic to be processed by the at least one simulated processor; and a memory subsystem that is shared between the at least one simulated processor and the trace-based traffic generator, wherein the trace-based traffic generator performs a data exchange with the memory subsystem based on the at least one workload trace, the data exchange impacting a measured performance of the at least one simulated processor.

2. The computer system of claim 1, wherein the at least one lower-level cache includes a first lower-level cache and a second lower-level cache having a lower hierarchy than the first lower-level cache.

3. The computer system of claim 2, wherein the first lower-level cache and a second lower-level cache are exclusive of one another.

4. The computer system of claim 3, wherein the first lower-level cache has a first cache size and the second lower-level cache has a second cache size, and wherein each modeled cache included in the plurality of modeled caches has an effective cache size defined as a sum of the first cache size and the second cache size.

5. The computer system of claim 3, wherein the data exchange includes at least one signal selected among the group comprising a cache line read signal, a returned cache line signal, and a reload signal.

6. The computer system of claim 5, wherein the trace-based traffic generator further comprises a plurality of prefetchers, each prefetcher associated with a respective modeled cache.

7. The computer system of claim 6, wherein the data exchange further includes a memory bandwidth utilization signal indicating a current memory usage of the memory subsystem, and wherein a given prefetch among the plurality of prefetchers dynamically determines an amount of data to prefetch based on the memory bandwidth utilization signal.

8. A computer implemented method comprising:

simulating at least one processor including a core element and at least one lower-level cache excluded from the core element;

simulating a trace-based traffic generator that includes a plurality of modeled caches that model the at least one lower-level cache without modeling the core element, the simulated trace-based traffic generator configured to receive at least one workload trace and based on the workload trace to simulate actual memory traffic to be processed; and simulating a memory subsystem that is shared between the at least one simulated processor and the simulated trace-based traffic generator, wherein the simulated trace-based traffic generator performs a data exchange with the simulated memory subsystem based on the at least one workload trace, the data exchange impacting a measured performance of the at least one simulated processor.

9. The method of claim 8, wherein the at least one lower-level cache includes a first lower-level cache and a second lower-level cache having a lower hierarchy than the first lower-level cache.

10. The method of claim 9, wherein the first lower-level cache and a second lower-level cache are exclusive of one another.

11. The method of claim 10, wherein the first lower-level cache has a first cache size and the second lower-level cache has a second cache size, and wherein each modeled cache included in the plurality of modeled caches has an effective cache size defined as a sum of the first cache size and the second cache size.

12. The method of claim 10, wherein the data exchange includes at least one signal selected among the group comprising a cache line read signal, a returned cache line signal, and a reload signal.

13. The method of claim 12, wherein the simulated trace-based traffic generator further comprises a plurality of prefetchers, each prefetcher associated with a respective modeled cache.

14. The method of claim 13, wherein the data exchange further includes a memory bandwidth utilization signal indicating a current memory usage of the memory subsystem, and wherein a given prefetch among the plurality of prefetchers dynamically determines an amount of data to prefetch based on the memory bandwidth utilization signal.

15. A computer program product comprising a non-transitory computer readable storage medium having program instructions embodied therewith, the program instructions executable by one or more processors to cause the one or more processors to perform operations comprising:

simulating at least one processor including a core element and at least one lower-level cache excluded from the core element;

simulating a trace-based traffic generator that includes a plurality of modeled caches that model the at least one lower-level cache without modeling the core element, the simulated trace-based traffic generator configured to receive at least one workload trace and based on the workload trace to simulate actual memory traffic to be processed; and simulating a memory subsystem that is shared between the at least one simulated processor and the simulated trace-based traffic generator, wherein the simulated trace-based traffic generator performs a data exchange with the simulated memory subsystem based on the at least one workload trace, the data exchange impacting a measured performance of the at least one simulated processor.

16. The computer program product of claim 15, wherein the at least one lower-level cache includes a first lower-level cache and a second lower-level cache having a lower hierarchy than the first lower-level cache.

17. The computer program product of claim 16, wherein the first lower-level cache and a second lower-level cache are exclusive of one another.

18. The computer program product of claim 17, wherein the first lower-level cache has a first cache size and the second lower-level cache has a second cache size, and wherein each modeled cache included in the plurality of modeled caches has an effective cache size defined as a sum of the first cache size and the second cache size.

19. The computer program product of claim 17, wherein the data exchange includes at least one signal selected among the group comprising a cache line read signal, a returned cache line signal, and a reload signal.

20. The computer program product of claim 19, wherein the simulated trace-based traffic generator further comprises a plurality of prefetchers, each prefetcher associated with a respective modeled cache, wherein the data exchange further includes a memory bandwidth utilization signal indicating a current memory usage of the memory subsystem, and wherein a given prefetch among the plurality of prefetchers dynamically determines an amount of data to prefetch based on the memory bandwidth utilization signal.

* * * * *